United States Patent [19]

Leitz, deceased

[11] Patent Number: 5,335,761
[45] Date of Patent: Aug. 9, 1994

[54] CLAMPING MEMBER FREE-WHEEL WITH AT LEAST ONE PLASTIC CAGE RING

[75] Inventor: Hermann Leitz, deceased, late of Heidelberg, Fed. Rep. of Germany, by Sigrid Leitz, heiress

[73] Assignee: Borg-Warner Automotive GmbH, Ketsch, Fed. Rep. of Germany

[21] Appl. No.: 854,635
[22] PCT Filed: Nov. 11, 1991
[86] PCT No.: PCT/DE91/00869
§ 371 Date: Jul. 6, 1992
§ 102(e) Date: Jul. 6, 1992
[87] PCT Pub. No.: WO92/08907
PCT Pub. Date: May 29, 1992

[30] Foreign Application Priority Data
Nov. 9, 1990 [EP] European Pat. Off. ........ 90121441.1

[51] Int. Cl.⁵ ............................................. F16D 41/07
[52] U.S. Cl. .................................. 192/45.1; 192/41 A
[58] Field of Search ...................... 192/45.1, 41 A; 188/82.8

[56] References Cited

U.S. PATENT DOCUMENTS

| | | | |
|---|---|---|---|
| 2,753,027 | 7/1956 | Troendly et al. | 192/45.1 |
| 2,824,635 | 2/1958 | Troendly et al. | 192/45.1 |
| 3,219,163 | 11/1965 | Zlotek | 192/45.1 |
| 4,114,739 | 9/1978 | Colonna et al. | 192/41 A |
| 4,252,221 | 2/1981 | Lanzerath et al. | 192/41 A |
| 4,327,822 | 5/1982 | Vögele et al. | 192/41 A |
| 4,347,920 | 9/1982 | Bordes | 192/41 A |
| 4,998,605 | 3/1991 | Ferris | 192/41 A |

FOREIGN PATENT DOCUMENTS

| | | |
|---|---|---|
| 1291579 | 7/1965 | Fed. Rep. of Germany . |
| 2758841 | 7/1979 | Fed. Rep. of Germany . |
| 1072566 | 12/1952 | France . |
| 2342429 | 2/1976 | France . |
| 2385948 | 10/1978 | France . |
| 2456258 | 12/1980 | France . |
| 1174226 | 12/1969 | United Kingdom . |
| 2050536 | 1/1981 | United Kingdom . |
| 2084671 | 4/1982 | United Kingdom . |

Primary Examiner—Leslie A. Braun
Assistant Examiner—Andrea Pitts
Attorney, Agent, or Firm—Greg Dziegielewski

[57] ABSTRACT

The free-wheel has an inner ring (30, 138) and an outer ring (32, 140). Generally bone-shaped clamping elements (18, 116) are located between the rings (30, 32; 138, 140) which are provided with an outer radial thickening (24), a central waist (22, 152) and an inner radial thickening (20, 150). A cage ring (10, 142) that guides the clamping elements (18, 116) in a synchronous manner is arranged at the height at the inner radial thickening (20, 150). The cage ring (10, 142) consists of two cage ring segments (34, 144) that have an axial distance to each other and axial webs (38, 146) that connect the same and between which pockets (14, 148) for the clamping elements (18, 116) are formed. The cage ring (10, 142) consists of a viscoelastic plastic material, in particular an elastomer. Its webs (38, 146) have such a radial thickness that generally corresponds with the inner radial thickening (20, 150) of the clamping elements (18, 116), at least on the side impinged on by a clamping element (18, 116) during a rebound of the same ("popping") caused by an overload.

40 Claims, 12 Drawing Sheets

CLAMPING MEMBER FREE-WHEEL WITH AT LEAST ONE PLASTIC CAGE RING

BACKGROUND OF THE INVENTION

The invention concerns a clamping element free-wheel with an inner ring and an outer ring, with basically bone-shaped clamping elements arranged between the rings that have a outer radial thickening, a central waist and an inner radial thickening, and with a cage ring arranged on the height of the inner radial thickening of the clamping elements which guides the same in a synchronous manner and consists of two cage ring segments that have an axial distance to each other and axial webs that connect the cage ring segments between which pockets for the clamping elements are formed.

A free-wheel of this sort with one single cage ring is known from U.S. Pat. No. 2,753,027. Free-wheels with double cages that are provided with a cage ring of the mentioned sort as inner cage ring are described in DE-A-27 58 841 and U.S. Pat. No. 4,998,605. In the double cage variation according to FIG. 5 in U.S. Pat. No. 4,998,605, the flexible tongues that impinge on the clamping elements are molded onto the webs of the inner cage ring which consists of plastic. The flexible tongues can be easily damaged when a rebound of the clamping element ("popping") caused by an overload occurs. The earlier inventions do not counter the rebounding of clamping elements between the cage rings resulting in jamming ("pop-out"), which is also caused by an overload. In DE-A-27 58 841 and the variation according to FIG. 6 in U.S. Pat. No. 4,998,605, the webs of the inner cage ring have a radial thickness which is too minute to provide an effective pop-out protection.

The invention is based on the objective of creating a clamping element free-wheel of the initially mentioned kind that provides increased protection against a rebound of the clamping elements ("popping") caused by an overload and a possible jamming ("pop-out") of rebounding ("popping") clamping elements caused by an overload.

SUMMARY OF THE INVENTION

This objective is attained with a clamping element free-wheel of this sort by the fact that the cage ring consists of a viscoplastic plastic material, in particular an elastomer, and that its webs have a radial thickness that generally corresponds with one of the inner thickening of the clamping elements at least on the side impinged on by the clamping element during a rebound of a clamping element ("popping") caused by an overload.

The advances in plastic technology offer the possibility of manufacturing cage rings at low tool and operational costs which provide exceptional security against a rebounding of the clamping elements ("popping") caused by an overload thanks to minute tolerances in the width of the pockets and the spacing and centering. A viscoelastic plastic material is particularly suitable as the material for the cage ring. Should particularly disadvantageous operation conditions, such as for example torsional oscillations, oil contamination and the associated reduced frictional value, already present flattenings on the clamping elements surfaces caused by the wear and tear of the free-wheel and so forth, lead to a rebound and a subsequent impact of the clamping elements on the webs of the cage ring, the webs absorb the impact in an elastic manner. The clamping element is promptly returned into the engagement position in a spring-like manner and no permanent deformation occurs on the webs. The massive radial thickness of the webs, at least on the side impinged on by the rebounding clamping elements where the frontal surface of the webs can, for example, be radially raised, effectively prevents the pop-out of clamping elements and thus makes the cage ring exceptionally robust, so that no damage occurs, even with repeated popping occurrences. A simple removal from a plastic injection molding tool can be ensured with thick clamping elements or at least the side impinged on by the rebounding clamping element, for example by construction of thicker webs with a radially raised frontal surfaces.

The cage ring constructed according to the invention can represent the only cage ring of a clamping element free-wheel. However, it can also be applied for clamping element free-wheels with double cages and form the inner cage ring of such a free-wheel.

The webs of the cage ring can protrude radially outward over the outer diameter of the cage ring segments. It is also possible to mold correspondingly protruding ribs onto the webs which prevent the pop-out of clamping elements. The outer radial raising effectively prevents the pop-out of clamping elements. The outward protruding section of the webs can transform into a projection of the cage ring segments with preferably the same shape. This means that a thicker radially outward material bridge is created between the cage ring segments and the webs and a correspondingly higher stability results. It should be noted that the possibility exists of providing the cage ring with a larger outer diameter and letting the webs of the cage ring end flush radially outward with the outer diameter of the ring segments.

According to a further variation, the cage ring segments protrude radially outward over the webs. With a free-wheel with only one cage ring, the cage ring segments can extend up to the outer ring of the free-wheel and take over a centering function to the same. An oil insulation disc, bearing disc, or similar devices can be attached in an advantageous manner onto cage ring segments that maintain a radial distance towards the outer ring of the free-wheel. The outer radial U-ring profile of the cage ring ensures a simple mounting process and a well-centered arrangement of the spring ring between the cage ring segments.

The webs of the cage ring can protrude radially inward over the inner diameter of the ring segments. The inward protruding section of the webs takes over the centering function of the inner cage ring to the inner ring of the free wheel in an advantageous manner. The inward protruding section of the webs is preferably offset from the cage ring segments. This saves material and space for the attachment of lateral oil insulation discs and/or bearing discs that can be inserted into the cage ring with a projection adjoining one of the offset webs in an advantageous manner. It should be noted that the possibility exists of letting the webs of the cage ring end flush radially inward with the inner diameter of the ring segments.

The webs of the cage ring can have a profile that decreases from the maximum radial thickness at the side surface impinged on by the rebound caused by an overload to a smaller radial thickness in the peripheral direction. The webs can, for example, be tilted or graded at the outer radial side and, in particular, be rounded in a concave manner on the inner edge of the grading. Thanks to the radial raising and reinforcement in the area impinged on by the rebounding clamping elements, the webs provide optimal control over poppings. The webs absorb the energy of the rebounding clamping element without plastic deformation or damage and they return the clamping elements into the engagement position in a spring-like manner. Any eventual jamming of the clamping elements in the free-wheel direction between the cage rings ("pop-out") is effectively prevented. An otherwise thinner construction of the webs is suggested in the interest of material savings, as well as to create space for a spring ring with which the clamping elements are attached in a spring-like manner.

The side surfaces of the webs of the cage ring can be slanted against the peripheral direction. This arrangement provides the clamping elements in the pockets of the cage ring with the necessary torsion-free property for the adjusting movement between engagement and free-wheel position.

A spring ring consisting of band material with flexible tongues that impinge on the clamping elements and prestress the same in the rotation direction can be arranged at the elevation of the waist of the clamping elements.

With a free-wheel with a double cage, the spring ring rests in an annular gap between the cage rings that can be very small if the cage rings are manufactured from plastic without influencing the simple construction of the free-wheel. The spring ring located in the small annular gap is best protected against deformation by possible poppings.

The flexible tongues can branch off radially inward from the spring ring and extend over the area of smaller radial thickness of the webs. The webs are preferably tilted in correspondence with the tilt of the flexible tongues. A soft spring-like action of the clamping elements with a flat, linear spring characteristic is desired. Particularly suitable are flexible tongues that are tapered towards the end impinging on the clamping element.

The spring ring of the free-wheel does not have to be embossed. One can make due without the expensive embossing process and thus avoid possible mistakes and inaccuracies during the embossing process. A very exact spacing and correspondingly exact observance of the drag moment can be realized. The conventional tempering of the spring band after the embossing process can also be omitted. The flexible tongues preferably contact the clamping elements solely by the elastic deformation of the spring ring which results from the forced tilted position of the clamping element after installation of the free-wheel between outer and inner ring. It should be noted that it is also possible to utilize a spring ring with embossed flexible tongues for the free-wheel according to the invention.

With clamping element free-wheels with double cages, the spring ring is preferably open over its periphery. It is perfectly retained without the expensive connection of its ends in the very narrow annular gap, according to the invention between, the cage rings manufactured from plastic.

For free-wheels with one single cage ring, a spring ring that can be closed over its periphery with the aid of band ends that can be interlocked with each other is utilized. The spring ring in closed condition serves for the retention and additional guidance of the clamping elements.

The spring ring can also have a radial distance from the cage ring. However, an arrangement is possible in which the spring ring encompasses the cage ring in a flush arrangement.

The spring ring preferably consists of two axially spaced spring ring segments and axial spring ring webs that connect the same and between which pockets for the clamping elements are formed. At least one latch can be present on the spring ring webs which can be bent to form a hook and cut off on a different location in order to form an interlocking edge. The latter cutting process can in an advantageous manner be executed simultaneously with the cutting of the spring band sections. The bending or prebending of the hooks is preferably also executed simultaneously with the cutting process or after a possible embossing of the spring band. In a preferred example, the latch is cut off at the beginning of the band, bent to a hook at the end of the band and preferably otherwise unprocessed.

At least one flexible tongue that protrudes into the pocket for the clamping element and impinges on the same can be arranged on the spring ring webs. In one particular variation, one flexible tongue and one latch, each in a symmetrical arrangement on both sides, are located in the axial central area of the spring ring webs; [this latch] can be bent to form a hook or cut off at a different location in order to form an interlocking edge. In a different variation, such a latch and one flexible tongue, each in a symmetrical arrangement on both sides, are arranged in the axial central area of the webs.

The spring ring can also have a billow obtained by embossing. This is particularly advantageous for the round shape of the spring ring. The hooks, the flexible tongues and possibly also the billow of the spring ring can be directed radially inward or radially outward. This is particularly valid for a spring ring that has a radial distance from the cage ring. For a spring ring that encompasses the cage ring in a flush arrangement, an orientation of the hooks, flexible tongues and possibly also the billow that is directed radially towards the outside is preferred.

The radially inward directed billow can lie in the area of smaller radial thickness of the webs of the cage ring or the cage ring segments. The webs can be provided with a recess that corresponds with the contour of the billow.

The spring rings preferably consist of spring band sections that are cut from a continuous band. The ring segments at the band end of the spring band segments are preferably separated at extensions of the frontal edge of the web from which the hooks protrude. The beginning of the spring band section can be formed by a web from which the latches are cut off in order to form the interlocking edges. Another possibility is to let the ring segments at the beginning of the spring band section protrude over the first web from which the latches are cut off, namely to let them protrude as far as possible. This results in an improved round shape of the spring ring that is enclosed by interlocking.

For utilization in a free-wheel with a double cage, the described inner cage ring is preferably combined with an outer cage ring that consists of a hard plastic with or without fiber reinforcement, in particular fiberglass reinforcement, as for example glass fiber reinforced polyamide or a viscoelastic plastic material, in particular an elastomer. The outer cage ring preferably also has a massive thickness that generally corresponds with the outer radial thickening of the clamping elements. This makes it easy to mold a functional element for the frictional engagement and/or interlocking axial attachment of the outer cage ring to the outer ring of the free-wheel. These functional elements are described in EP-A-0 291 550 and EP-A-0 370 119 by the applicant. The advantages of an outer cage ring consisting of plastic are thus combined with those of a simple inner cage ring consisting of plastic which provides exceptional protection against poppings and pop-outs. Ribs that are molded onto the webs of the outer cage ring are suggested for the frictional engagement of the outer cage ring, whereby the ribs are preferably offset from the cage ring segments in order to create space for the attachment of lateral oil insulation discs and/or bearing discs that are advantageously attached to the outer cage ring with a projection adjoining the offset ribs.

In the interest of high temperature resistance, at least one of the cage rings of a double cage can entirely or partially consist of a plastic crosslinked by gamma-radiation. The cage rings are manufactured by injection molding from a plastic material that is provided with a suitable additive and subsequently exposed to gamma-radiation. This process provides a high temperature resistance for comparatively inexpensive plastic materials.

The invention is described more closely in the following with the aid of examples that are illustrated in the drawings.

DETAILED DESCRIPTION OF THE PREFERRED EMBODIMENT

Figure 1:
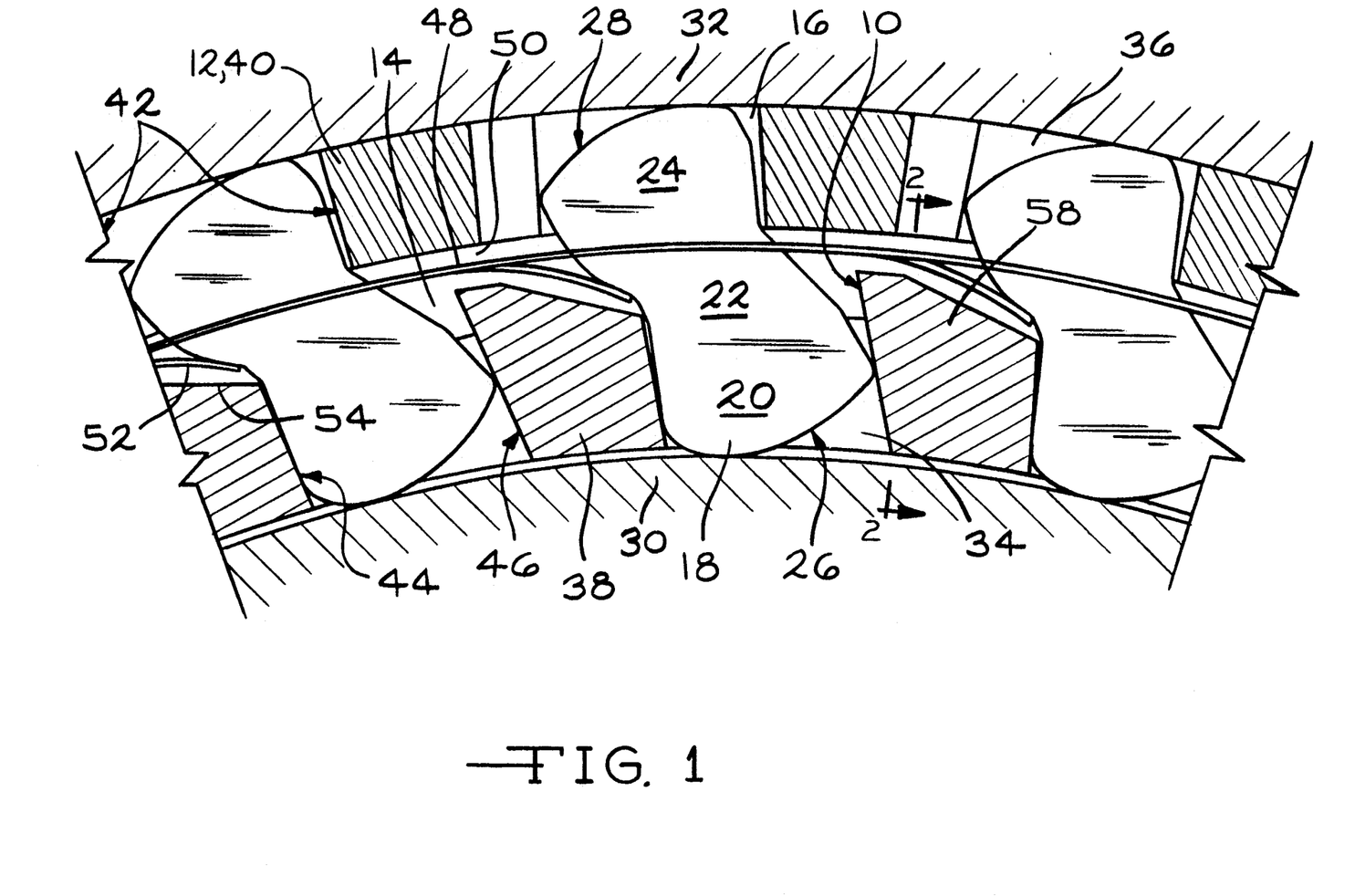
FIG. 1 the radial section of a first clamping element free-wheel with a double cage that has an inner cage ring and an outer cage ring.

The clamping element free-wheel with double cage illustrated in FIG. 1 has an inner cage ring (10) and an outer cage ring (12), both of which consist of plastic. Pockets (14, 16) in the cage rings (10, 12) are distributed over the periphery of the same and serve as receptacles for a number of basically bone-shaped clamping elements (18). The clamping elements (18) have an inner radial thickening (20), a central narrowing (waist 22) and an outer radial thickening (24). Clamping surfaces are arranged on the inner radial side (26) of the inner thickening (20) and on the outer radial side (28) of the outer thickening (24) which engage with an inner ring (30) or outer ring (32) of the free-wheel and couple these rings (30, 32) in such a way that the torque is transferred in one rotation direction and the rings are released in the opposite rotation direction. The cage rings (10, 12) that are adjustable relative to each other in peripheral direction ensure a synchronous guidance and even torque-absorbing stress of the clamping elements (18).

Figure 2:
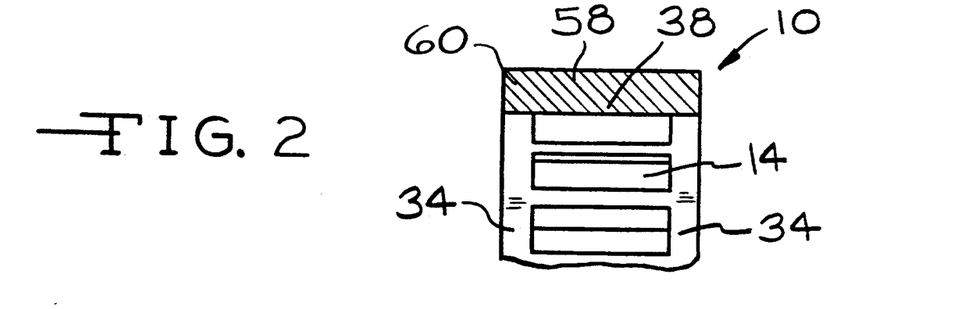
FIG. 2 a section through the inner cage ring of the free-wheel along line 2—2 in FIG. 1.
Figure 3:
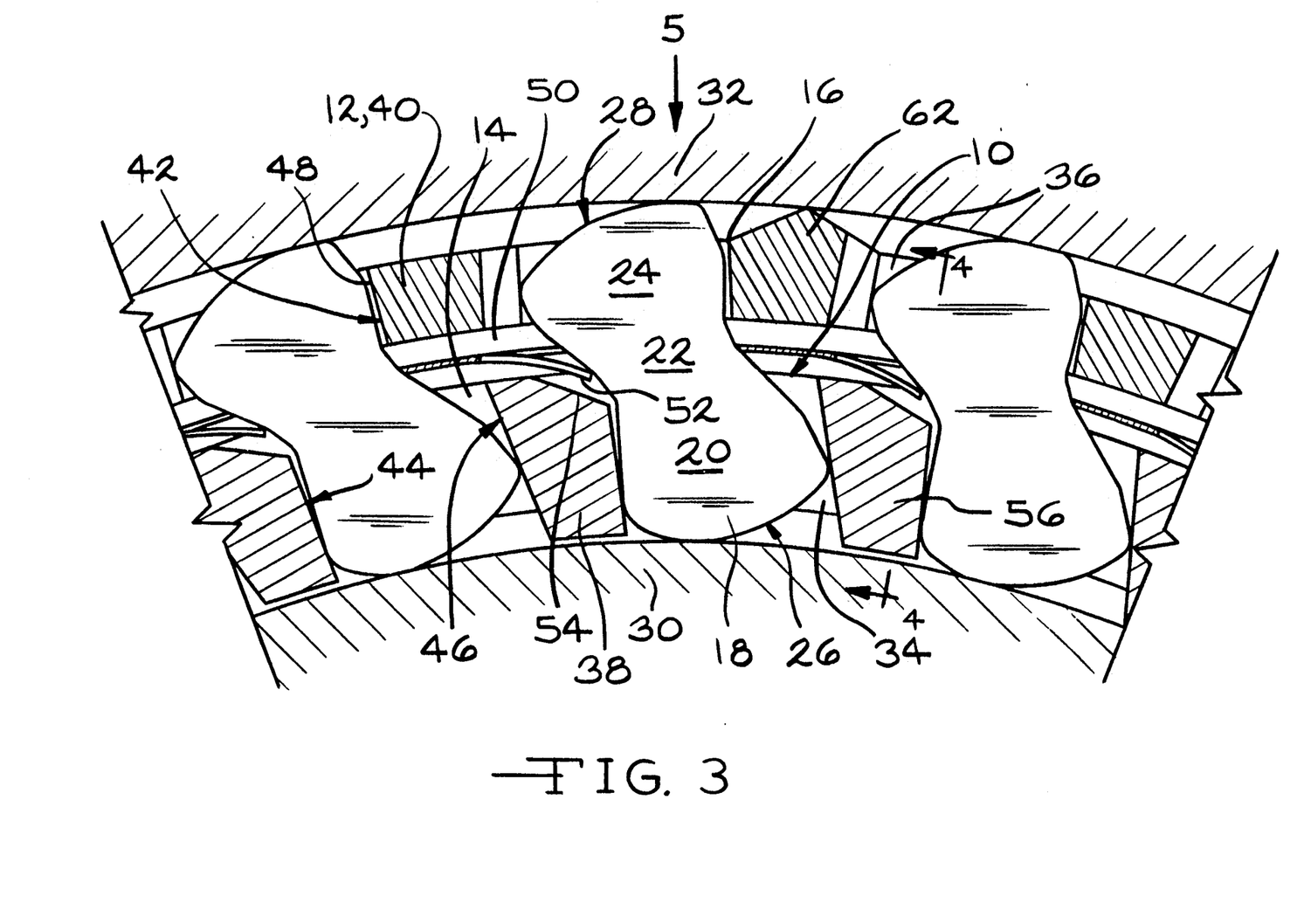
FIG. 3 the radial section of a second clamping element free-wheel with a double cage.
Figure 4:
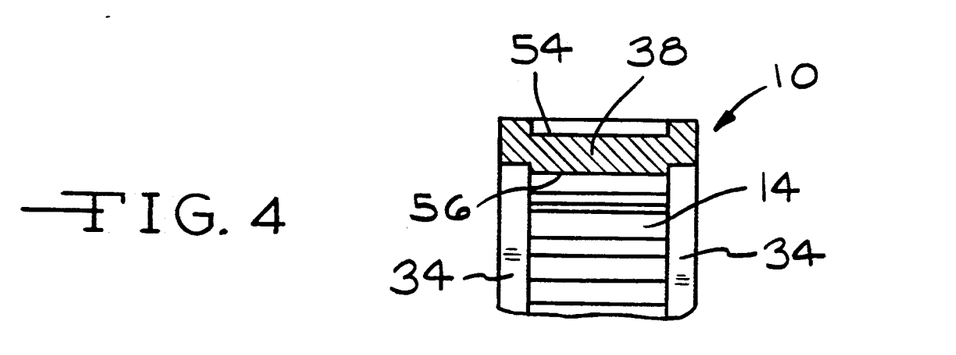
FIG. 4 a section through the inner cage ring of the free-wheel along line 4—4 in FIG. 3.
Figure 5:
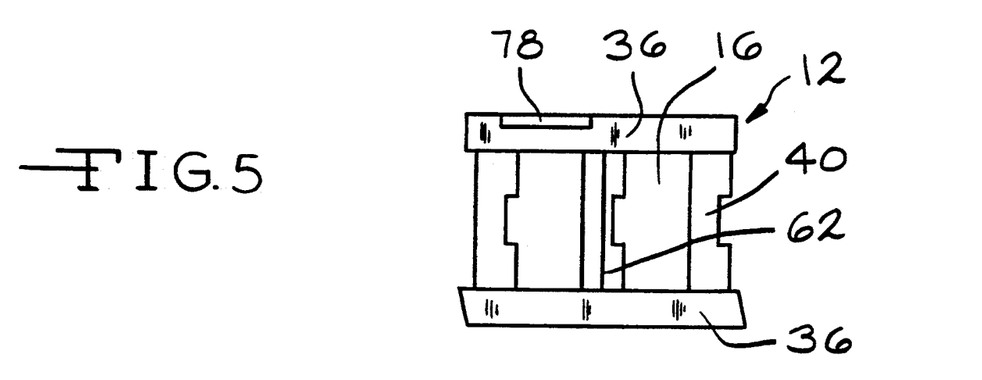
FIG. 5 a radial top view of the outer cage ring of the free-wheel in viewing direction 5 in FIG. 3.
Figure 6:
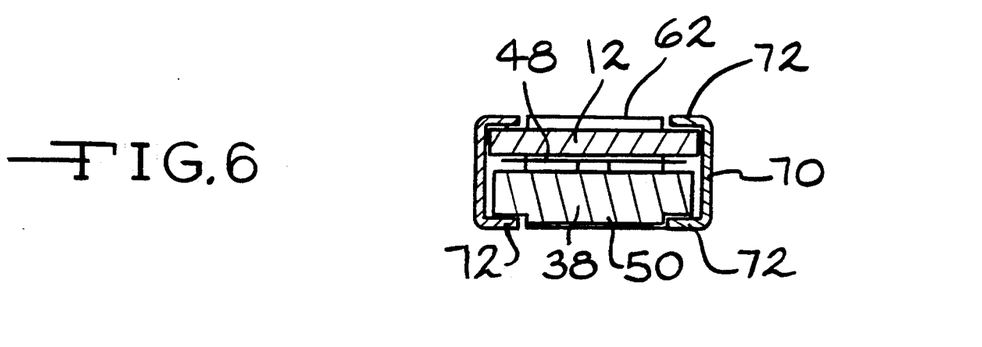
FIG. 6 an axial section of the cage rings in assembled condition with oil insulation and/or bearing discs attached on both sides.

FIG. 2, FIG. 4 and FIG. 5 show that the cage rings (10, 12) consist of two cage ring segments (34, 36) that have an axial distance to each other and axial webs (38, 40) that connect the cage ring segments, whereby pockets (14, 16) for the clamping elements (18) are formed between the webs. While the axial side surfaces (42) of the webs (40) have a radial orientation in the outer cage ring (12), the axial side surfaces (44, 46) of the webs (38) of the inner cage ring (10) are tilted against the peripheral direction. The clamping elements (18) are thus provided with torsion-free qualities for the adjusting movement into the free-wheel and position the engagement position in which the torque is transferred.

The clamping elements (18) engage in a spring-like manner. A spring ring (48) that is located in the annular gap (50) between the cage rings (10, 12) serves for this purpose. In the installed condition, flexible tongues (52) extend from the spring ring (48) in an angle, which is caused by elastic deformation, and branch off radially inward from the spring ring (48) and impinge on the outer thickening (24) of the clamping elements (18), commencing from the waist (22). The flexible tongues (52) can be tapered towards the clamping element (18) (not shown). The spring ring (48) is not embossed and is open over its periphery.

The inner cage ring (10) of the double cage consists of a viscoelastic plastic material, preferably an elastomer. It has a massive radial thickness that sectionally corresponds with the inner radial thickening (20) of the clamping elements (18). This is valid in the peripheral area on and behind the side surfaces (46) of the webs (38) opposite the engagement side that is impinged on by the clamping element (18) during a rebound of the same ("popping") caused by an overload. The thickness of the webs (38) is at its largest at this location. The webs (38) have a radially outward slanted profile, so that their thickness decreases towards the side surfaces (44) of the webs (38) on the engagement side. The tilt (54) corresponds with the tilt of the flexible tongues (52) that results in the installed condition from the elastic deformation of the spring ring (48), whereby the flexible tongues extend radially outward within a distance from the tilted areas of the webs (38).

The webs (38) of the inner cage ring (10) protrude radially outward over the cage ring segments (34). FIG. 2 shows that the cage ring segments (34) are provided with radial outward projections (60) whose profile corresponds with the protruding section (58) of the webs (38), whereby the projections reinforce the one-piece material bridges between the cage ring segments (34) and the webs (38). The webs (38) of the inner cage ring (10) end radially inward flush with the inner diameter of the cage ring segments (34).

The outer cage ring (12) can consist of a hard plastic with or without fiber reinforcement, for example glass fiber reinforced polyamide, or even of a viscoelastic plastic material. The outer cage ring also has a massive radial thickness that generally corresponds with the outer radial thickening (24) of the clamping element (18). The annular gap (50) that serves as receptacle for the spring ring (48) between the cage rings (10, 12) is very narrow and suitable as a well-centered receptacle for a spring ring (48) without billow embossing.

FIG. 3 to FIG. 6 show a variation with a somewhat thinner outer cage ring (12) onto whose cage ring segment (34) radially protruding carriers (78) are molded that engage into a peripheral groove in the outer ring (32) of the free-wheel in order to axially fix the outer cage ring (12). Single webs (40) of the outer cage ring (12) are provided with ribs (62) on their outer radial sides which are in frictional engagement with the outer ring (32) of the free-wheel. The ribs (62) have a triangular profile with outward facing tip. They are molded onto the webs (40) in one piece, extend over their entire axial length and are arranged within a distance from the ring segments (36), so that an oil insulation disc or bearing disc (70) can be clipped onto the outer cage ring (12). The disc (70) has a U-shaped ring profile. It overlaps the outer cage ring (12) with a U-shaped ring projection (72) that adjoins the off-set ribs (62).

The webs (38) of the inner cage ring (10) protrude radially inward over the cage ring segments (34). The radially inward protruding section (56) serves for the centering of the inner cage ring (12) to the inner ring (30) of the free-wheel. It is offset from the ring segments (34), so that the oil insulation disc or bearing disc (70) with their U-shaped ring projection (74) can be inserted into the inner cage ring (10). The ring projection (74) adjoins the offset webs (38).

The furthest protruding section (58) of the webs (38) continues radially outward and ends immediately behind the frontal surface (46) opposite the engagement side flush with the outer diameter of the cage ring segments (34). The tilt (54) of the webs (38) is offset from the cage ring segments (34).

Figure 7:
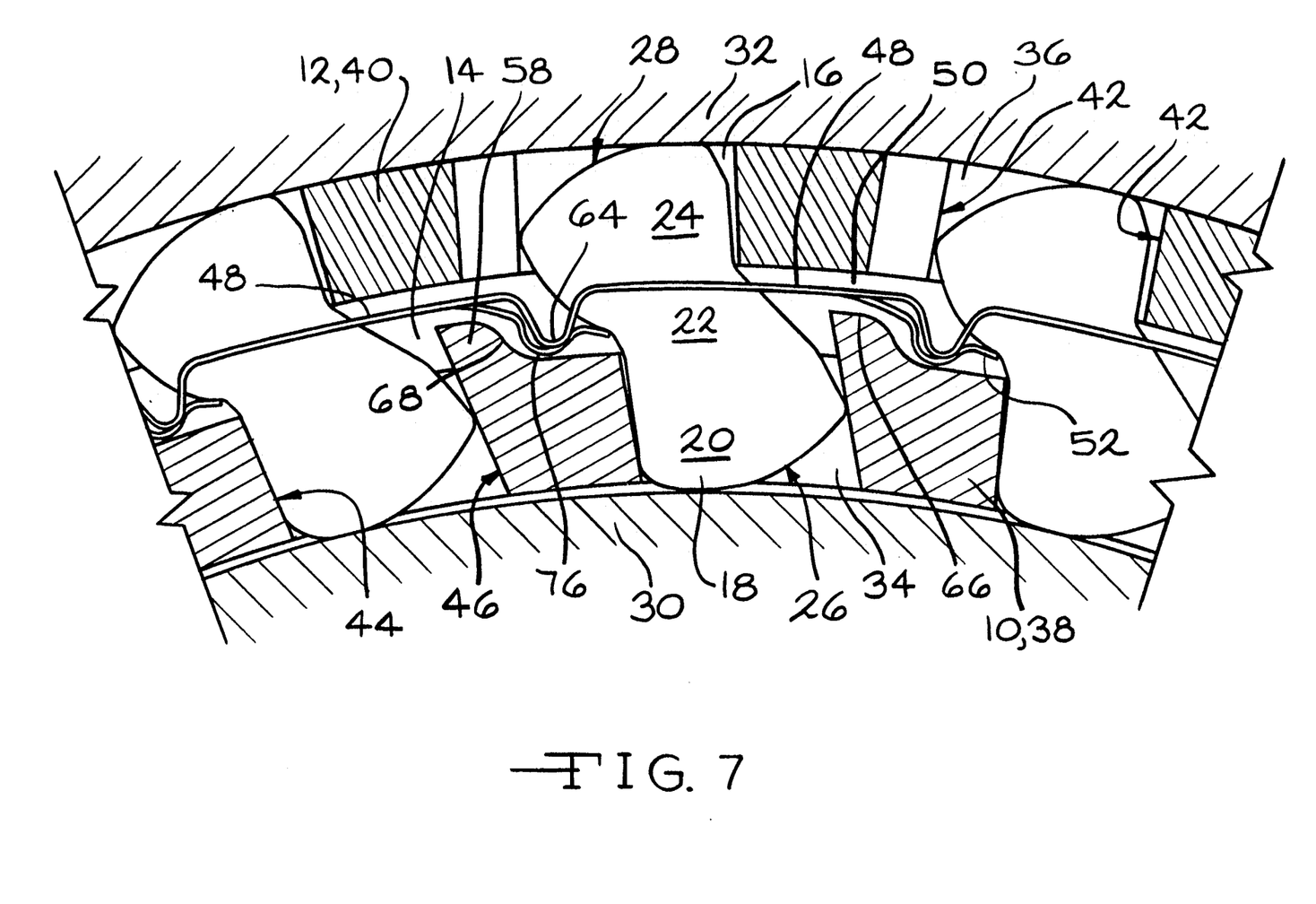
FIG. 7 a radial section of a third clamping element free-wheel with a double cage.

FIG. 7 shows a free-wheel whose spring ring (48) is provided with a billow embossing, whereby the billows (64) point radially inward. The webs (38) of the inner cage ring (10) are profiled in such a way that a space for the billows (64) and flexible tongues (52) is created radially outward from the inner cage ring, whereby the billows and the flexible tongues are provided with a corresponding billow embossing (76). The web profile begins at a stage (66) of maximal thickness and decreases to a smaller thickness on the side surface (44) of the webs (38) on the engagement side behind the side surfaces (46) of the webs (38) that are impinged on during a rebound of the clamping elements (18). The billow shape of the spring ring (48) is rounded in a correspondingly concave shape (68) on the inner edge of the stage (66). The furthest radially outward protruding section (58) of the webs (38) protrudes over the outer diameter of the ring segments (34), so that a space for the billow embossing (64) of the peripheral webs of the spring ring (48) is created on both sides of the frontal surfaces of the clamping elements. Radially inward the webs (38) end flush with the inner diameter of the cage ring segments (34).

FIG. 8 to FIG. 22 show clamping element freewheels or components of the same with a single cage ring (142) and a spring ring (126) that is provided with interlockable band ends, whereby the spring ring in interlocked and enclosed condition serves for the retention and additional guidance of the clamping element (116).

Figure 8:
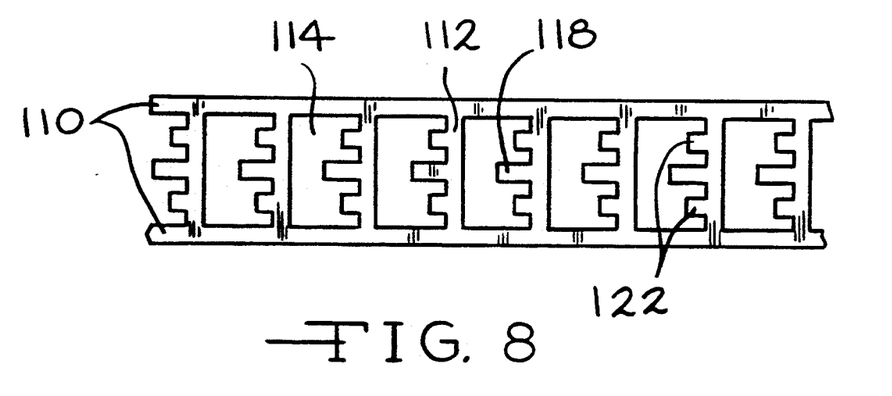
FIG. 8 a top view of a spring band from which several band sections were cut off in order to manufacture the spring rings.

The spring band illustrated in FIG. 8, from which bent segments were cut off in order to manufacture the spring rings (116), is punched out from a flat rectangular strip of spring steel. It consists of two parallel strips (110) that extend in longitudinal direction of the band and transverse webs (112) that connect the same. Pockets (114) for one clamping element (116) each are formed between the spring ring webs (112). A longer latch (118) that protrudes into the pocket (114) branches off from the center of the web and extends in longitudinal direction of the same, whereby the flexible tongue (120) that impinges on the clamping element (116) is formed out of this latch. Shorter latches (122) are provided on both sides of the central latch (118) in symmetrical arrangement which protrude into the pocket (114) in longitudinal direction of the same and can be bent to form hooks (124) that serve to enclose the periphery of the spring ring (126) consisting of an embossed or nonembossed spring band that is cut into a certain number of sections.

Figure 9:
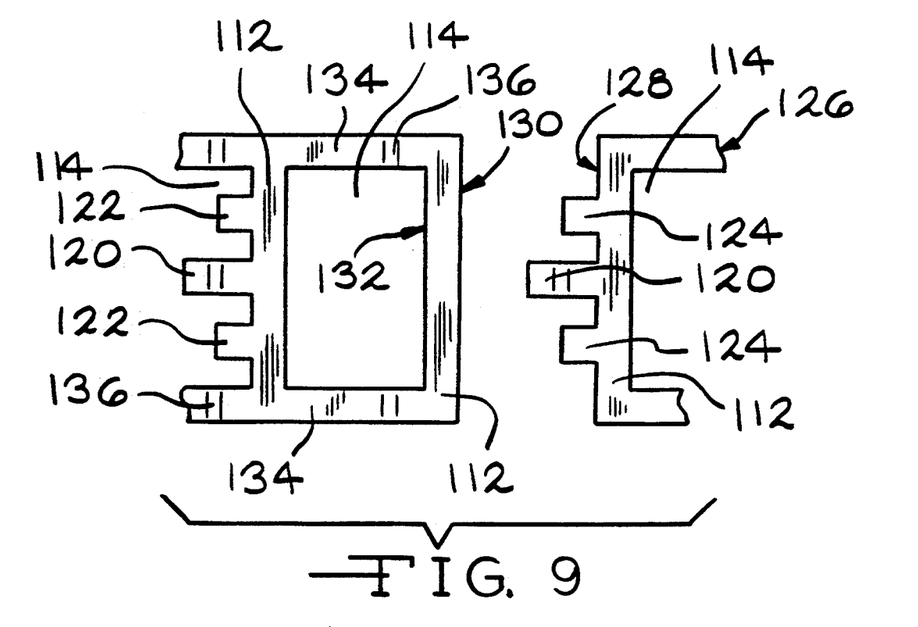
FIG. 9 the plane projection of a first variation of a cut and embossed spring band section.

FIG. 9 shows the spring band after the embossing process. The cutting line at the end of the spring band section along which the same is cut off from the continuous band extends in an extension of the frontal edge (128) of the web from which the latches (122) that will subsequently be bent to form a hook protrude. At the beginning of the band, the spring band section is cut off from the band in an extension of a rear edge (130) of the web. The latches (118, 122) are cut off at the corresponding frontal edge (132) of the web in order to form an interlocking edge. The central latches (118) on the webs (112) of the spring ring (126) are all bent in order to form the flexible tongues (120). The outer latches (122) are only bent to form hooks (124) at the end of the band and are otherwise unprocessed. The ring segments (134) of the spring ring (126) created by the lateral strips (110) are provided with a billow (136) in the radial direction. The billow of the ring segments and the bending of the flexible tongues (120) is preferably executed in one process during the embossing, but can also be executed in two successive processes. Simultaneously with, or after the (latter) embossing process, the spring band segments are cut off from the spring band that was curved by the billow (136) and the hooks (124) at the end of the band are prebent or bent simultaneously.

Figure 10:
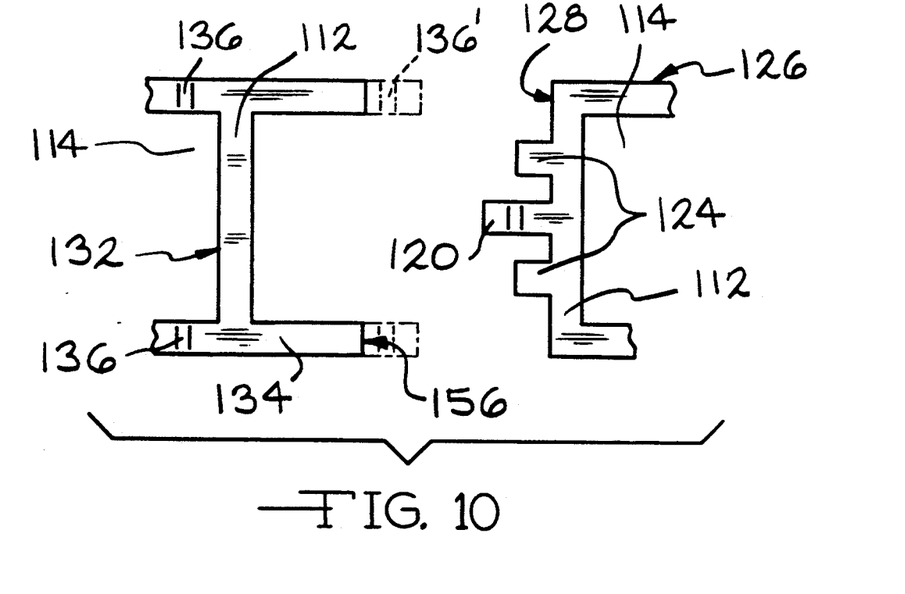
FIG. 10 the plane projection of a second variation of a cut and embossed spring band section.
Figure 11:
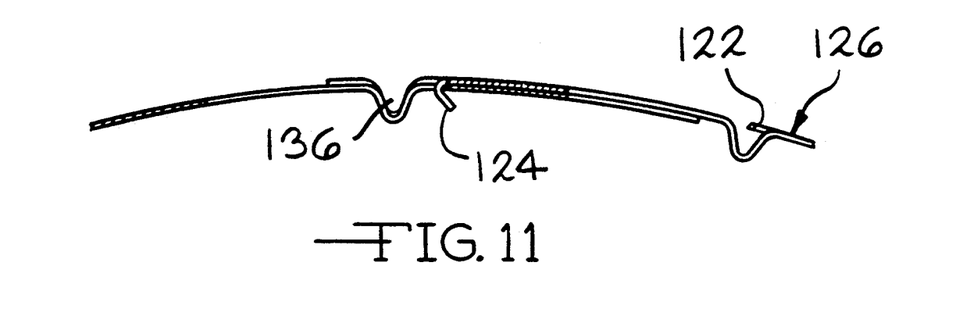
FIG. 11 a side view of a spring ring that has been bent to form the spring band section.

FIG. 10 and FIG. 11 show an alternative variation of the spring ring (126) in which the cutting line (156) that separates the strip (110) at the beginning of the band extends before the billow embossing (136') that is cut off. This means that the ring segments (134) protrude with maximum length from the first spring ring web (112) at the beginning of the band. This results in a better rounded shape of the closed spring ring (126).

Figure 12:
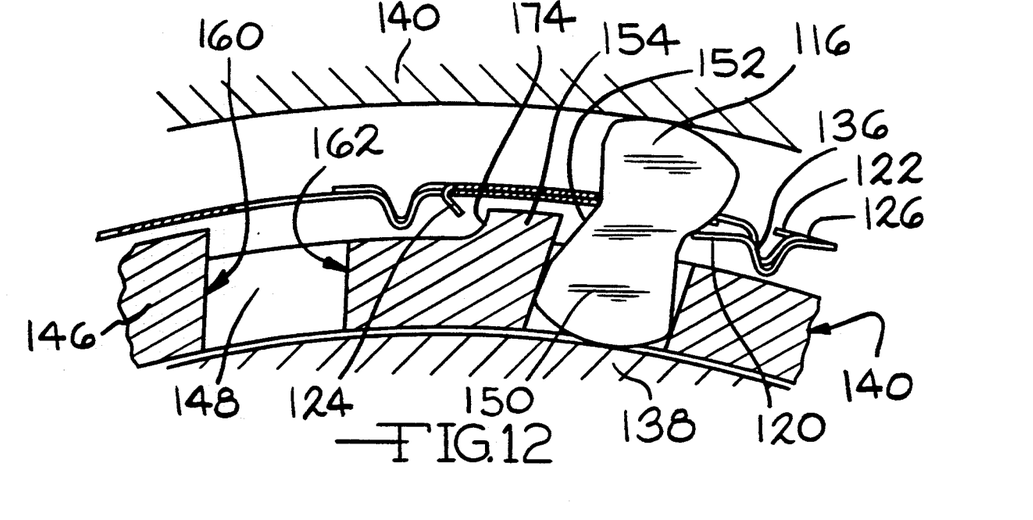
FIG. 12 s partially sectioned side view of a clamping element free-wheel with a single cage ring consisting of plastic and a spring ring that has a radial distance from the same and is bent to form a spring band section.

FIG. 12 shows a clamping element free-wheel with a spring ring (126) that consists of a spring band section that is interlocked at the ends of the band. The free-wheel has an inner ring (138) and an outer ring (140) which concentrically encompass each other with a spacing. Generally bone-shaped clamping elements (116) are located between the rings (138, 140). The clamping elements (116) engage during relative rotation of the rings (138, 140) in one direction (locking direction), so that the rings (138, 140) are coupled in order to transfer the torque. During relative rotation of the rings (138, 140) in the opposite direction (free-wheel direction) the rings (138, 140) are released.

The clamping elements (116) are spaced from each other and guided radially inward by one single cage ring (142). The cage ring (142) adjoins the free-wheel rings (138, 140) in a generally concentric manner and is provided with revolving ring segments (144) that are connected by axial webs (146). Pockets (148) are formed between the webs (146) which serve as receptacles for the inner radial thickening (150) of the clamping elements (116).

The clamping elements (116) are simultaneously retained in a spring-like manner and guided in the radial central area by the spring ring (126). The spring ring (126) rests radially outward from the cage ring (142) within a minute distance. The clamping elements (116) are inserted into the pockets (114) of the spring ring (126) with their central narrowing (152). The clamping elements (116) are impinged on by one radially inward directed flexible tongue (120) each and thus prestressed in engagement position. The billow (136) of the ring segments (134) is also directed radially inward. The spring ring (126) executes a guiding function for the clamping elements (116) by the fact that it is enclosed. For this purpose, the radially inward directed hooks (124) are engaged with the interlocking edges (132). The spring ring (126) is stressed in interlocked condition and secured by its elasticity.

The cage ring (142) consists of plastic, whereby preferably a viscoelastic material, in particular an elastomer, is utilized. The plastic cage ring shown is so thick that it can receive the entire inner radial thickening (150) of the clamping element (116). This is valid in the peripheral area on and behind the side surface (160) of the web (146) opposite the engagement side that is impinged on by a clamping element (116) during a rebound of the same ("popping") caused by an overload. In this particular instance, radially outward protruding ribs (154) that extend in axial direction are molded onto the webs (146) which further improve the protection against a jamming ("pop-out") of the rebounding clamping element (116). The ribs (154) protrude radially outward over the outer diameter of the cage ring segments (144). The spring ring (126) rests radially outward from the cage ring (142) within a minute distance. Its hooks (124) for the flexible tongues (120) and billows (136) are directed towards the inside and rest behind the ribs (154). The webs (146) end radially inward flush with the inner diameter of the cage ring segments (144).

Figure 13:
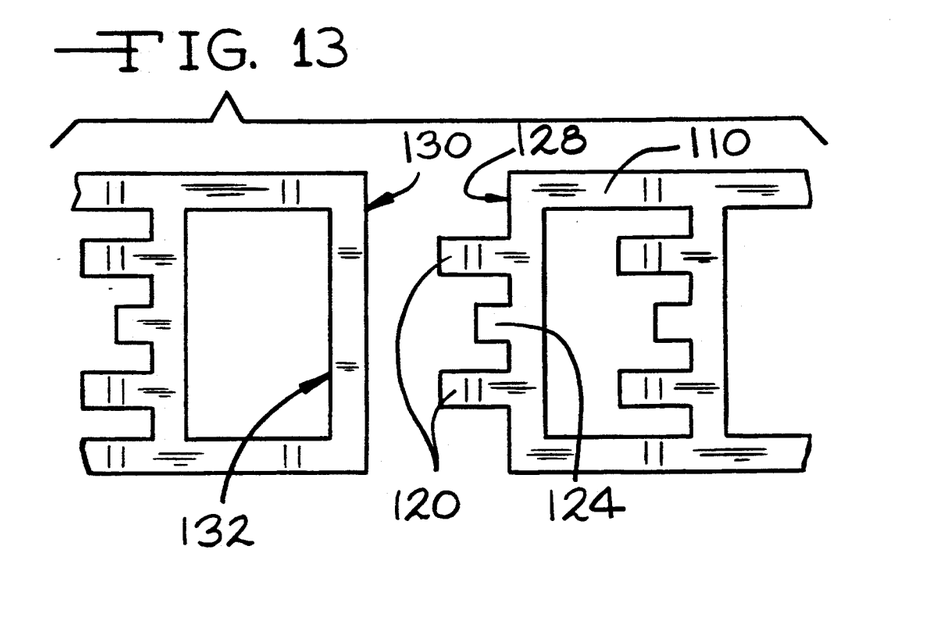
FIG. 13 and FIG. 14 a plane projection of a third and fourth variation of a cut and embossed spring band section.
Figure 14:
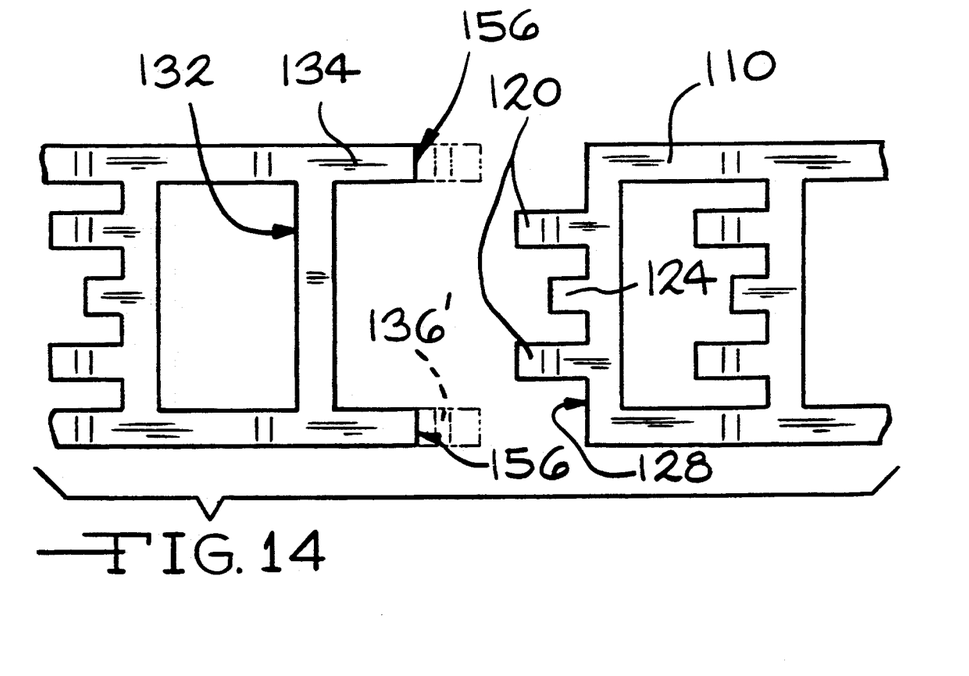

FIG. 13 and FIG. 14 show variations of a punched, embossed and cut spring band, whereby one single hook (124) branches off from the webs (112) in axial-central arrangement and the hook is surrounded by two flexible tongues (120) on both sides. The flexible tongues (120) and the billow (136) of the spring band have the same shape and are located at approximately the same height, which in turn simplifies the embossing process. According to FIG. 13, the beginning of the band is cut off in an extension of one rear edge (130) of the web, and according to FIG. 14, the beginning of the band is cut off before the billow (136'). At the end of the band, the cut extends in an extension of the frontal edge (128) of the web.

Figure 15:
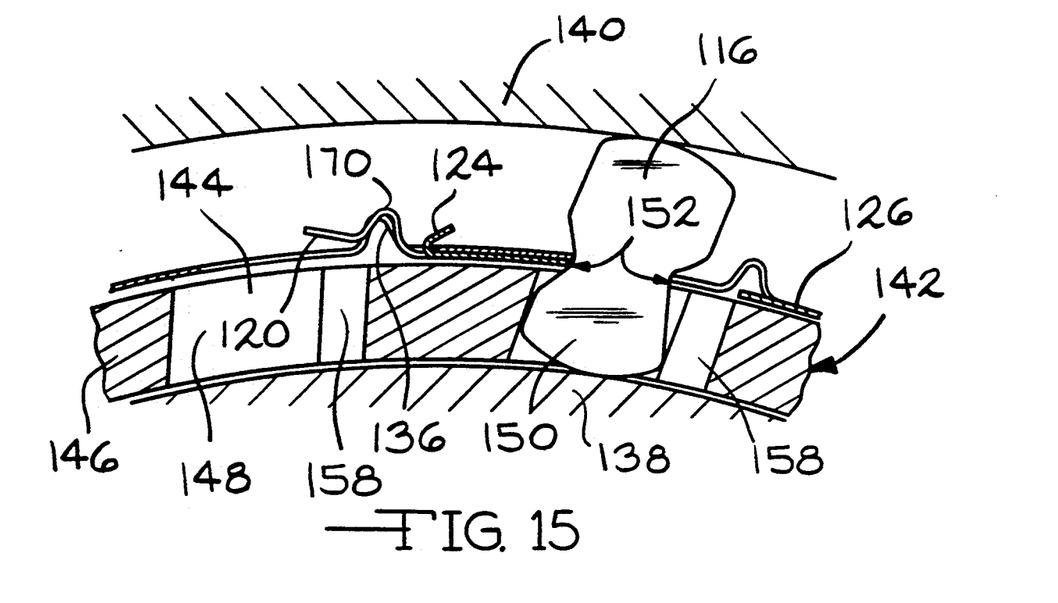
FIG. 15 and FIG. 16 partially sectioned side views of clamping element free-wheels with cage rings and spring rings encompassing the same in a flush arrangement.

FIG. 15 shows a clamping element free-wheel in which a spring band section according to FIG. 13 and FIG. 14 that was interlocked at its end to form a spring ring (126) directly adjoins the cage ring (142). The hook (124), the flexible tongues (120) and the billow (136) of the spring ring (126) are directed radially outward. The pockets (148) of the cage ring (142) are provided with enlargements (158) for the engagement of the flexible tongues (120).

Figure 16:
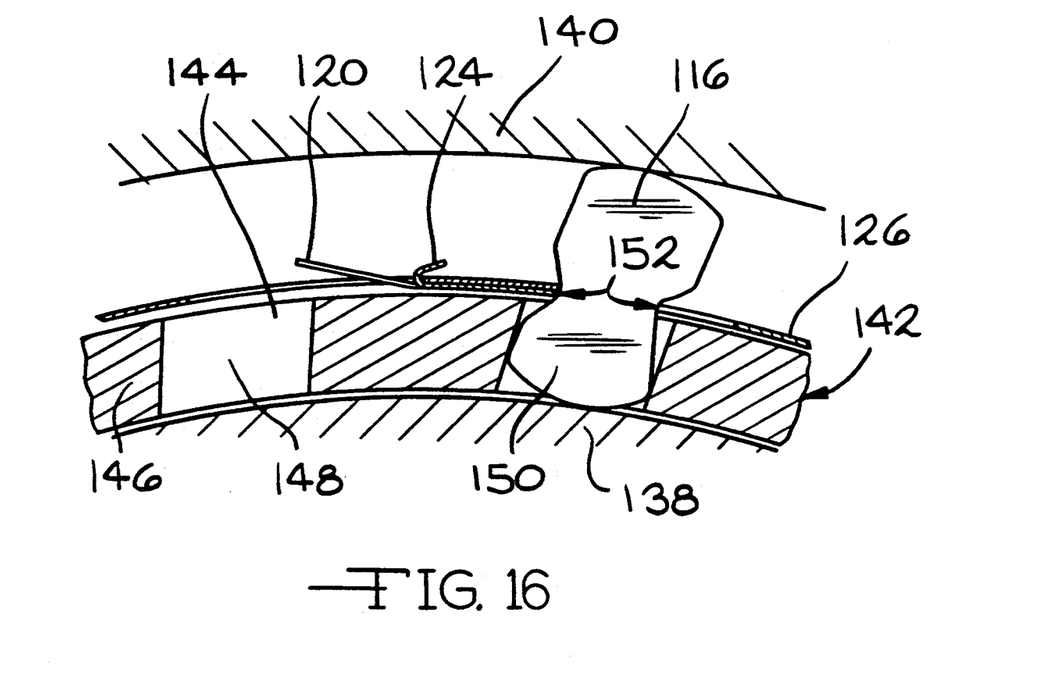

According to FIG. 16, a spring ring (126) without billow or flexible tongue embossing which encompasses and directly adjoins the cage ring (142) is utilized. The ends of the spring ring (126) are connected with each other by a radially outward directed hook (124). Enlargements in the pockets (148) of the cage ring (142) are not shown, but can be present, as shown in FIG. 15.

In the variations according to FIG. 15 and FIG. 16 the clamping element profile is modified in such a way that its waist (152) rests further radially inward in order to ensure an improved spring-like attachment.

Figure 17:
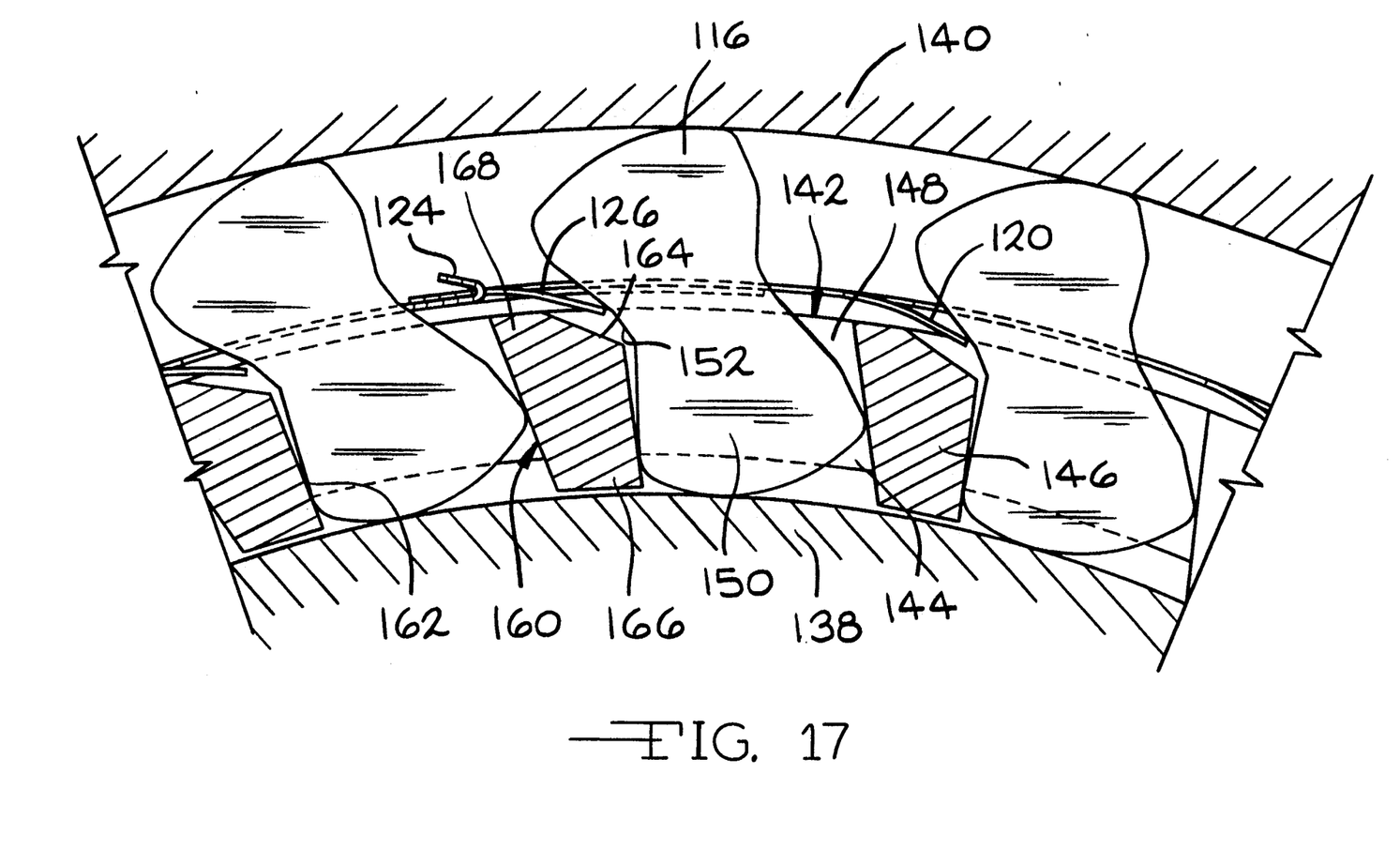
FIG. 17 to FIG. 19 and FIG. 21 partially sectioned side views of further clamping element free-wheels with one cage ring, each consisting of plastic.

The cage ring (142) of the clamping element free-wheel according to FIG. 17 consists of a viscoelastic plastic material. It has a massive radial thickness that sectionally corresponds with the radial inner thickening (150) of the clamping element (116). This is valid in the peripheral area on and behind the frontal surface (160) of the webs (146) opposite the engagement side that is impinged on during a popping of a clamping element. The thickness of the webs (146) is at its largest at this location. The webs (146) have a radially outward tilted profile, so that their thickness decreases towards the frontal surfaces (162) of the webs (146) on the engagement side. The tilt (164) corresponds with the tilt of the flexible tongues (120) of the non-embossed spring ring (126) that results in installed condition from the elastic deformation of the spring ring (126) which is interlocked at its ends. The spring ring (126) rests within a minute radial distance from the cage ring (142). Its flexible tongues (120) extend within a distance radially outward from the tilted areas (164) of the webs (146).

The webs (146) of the cage ring (142) protrude radially inward over the cage ring segments (144). The radially inward protruding section (166) serves for the centering of the cage ring (142) to the inner free-wheel ring (138). The furthest protruding section (168) of the webs (146) extends radially outward and ends flush with the outer diameter of the cage ring segment (144) immediately behind the frontal surface (160) opposite the engagement side. The profile tilt (164) of the webs (146) is offset from the cage ring segments (144) over the entire length of the web.

Figure 18:
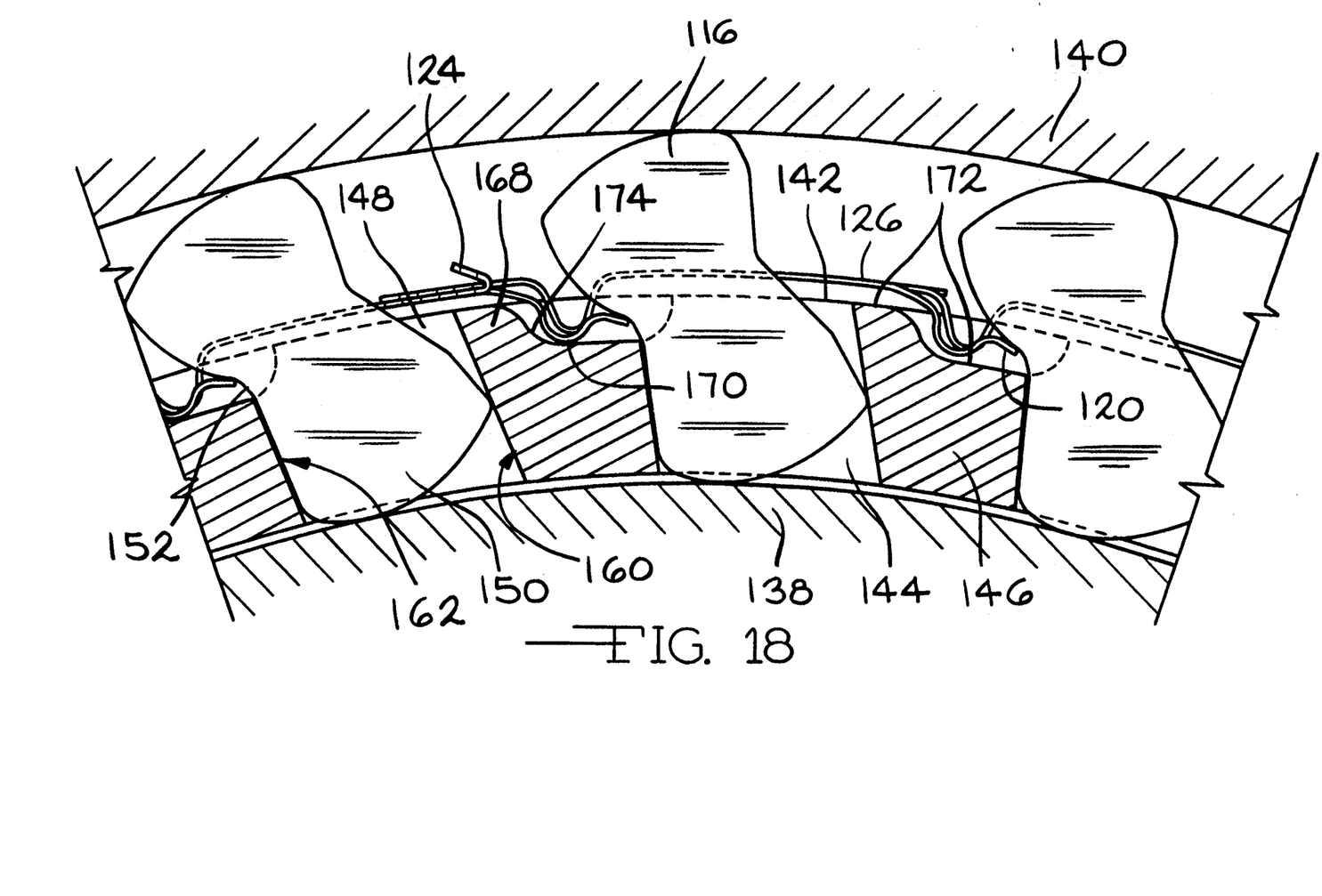
Figure 19:
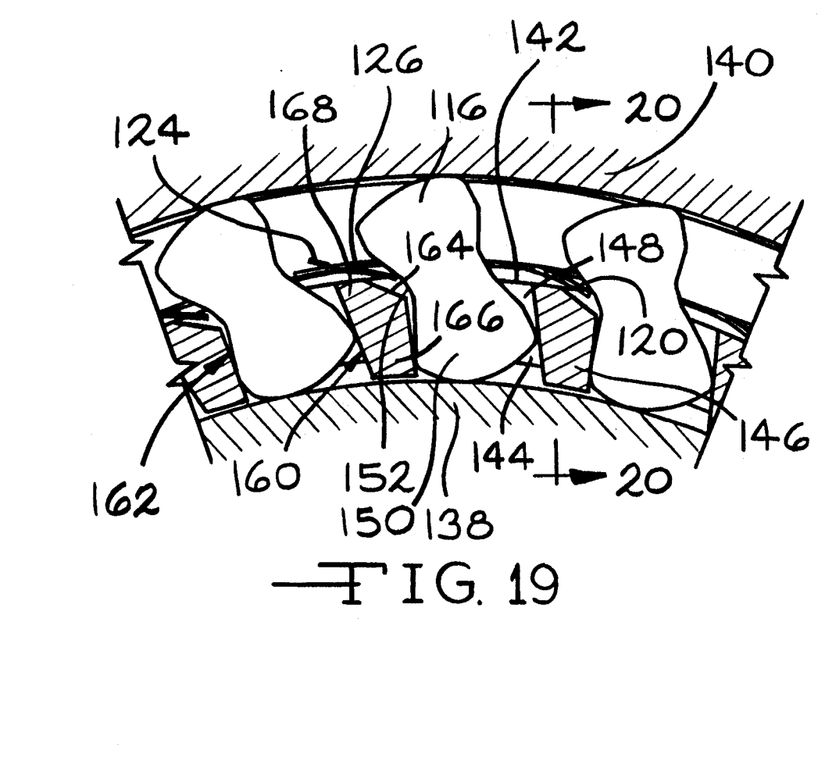
Figure 20:
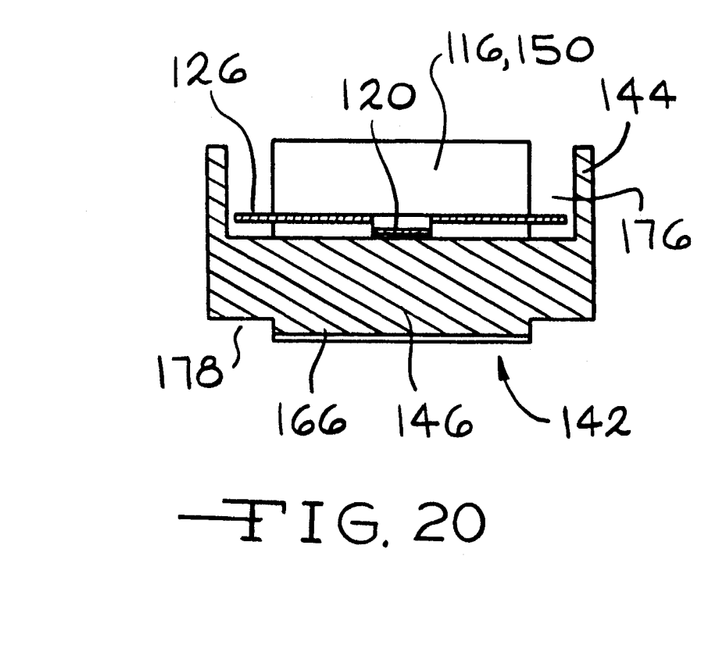
FIG. 20 a section "A—A" through the clamping element free-wheel according to FIG. 19.
Figure 21:
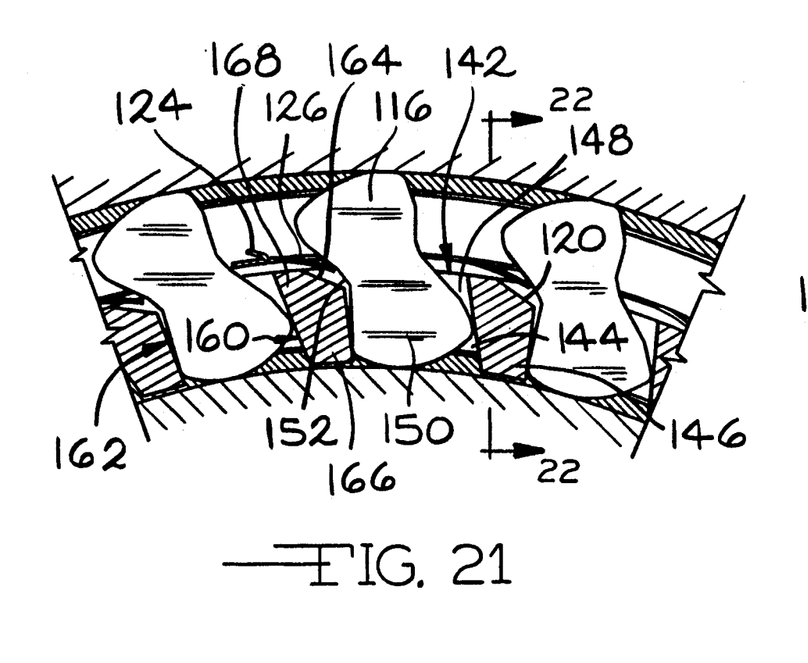
Figure 22:
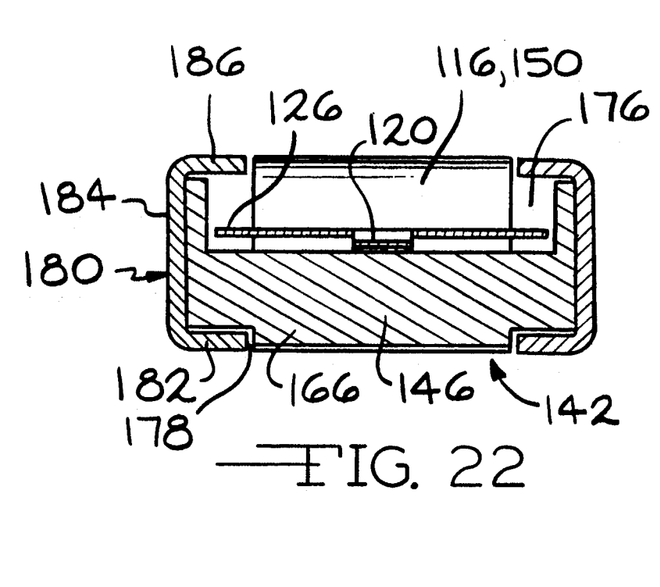
FIG. 22 section "B—B" through the clamping element free-wheel according to FIG. 21.

FIG. 18 shows a free-wheel whose spring ring (126) is provided with a billow embossing whose billows (136) are directed radially inward. The webs (146) of the cage ring (142) are profiled in such a way that space for the billows (136) and flexible tongues (120) are created radially outward form the webs, whereby the billows and the flexible tongues are provided with a corresponding billow embossing (170). The web profile originates at a stage (172) of maximum thickness and decreases to a smaller thickness at the frontal surfaces (162) of the webs (146) on the engagement side behind the side surfaces (160) of the webs (146) opposite the engagement side. The web profile is curved in a concave manner (174) corresponding with the billow shape of the spring ring (126) on the inner edge of the stage (172). The furthest protruding section (168) of the webs (148) ends radially outward flush with the outer diameter of the cage ring segments (144). The stage (172) of the webs (146) is offset from the cage ring segments (144). The webs (146) end radially inward flush with the inner diameter of the ring segments (144).

As compared to the free wheel illustrated in FIG. 17, the cage rings (142) of the free-wheels according to FIG. 19 to FIG. 22 are modified in such a way that the cage ring segments (144) protrude radially outward over the webs (146). The cage rings (142) have a U-ring profile in whose outer U-ring opening (176) the spring ring (126) rests. According to FIG. 19 and FIG. 20, the cage ring segments (144) extend up to the outer ring (140) of the free-wheel in order to execute the centering function. According to FIG. 21 and FIG. 22, the cage ring segments (144) are radially offset from the outer ring (140) of the free-wheel. The webs (146) protrude axial-central from the radially inner side of the cage rings (142) and they have an outer axial offset from the frontal surfaces of the cage ring (142). This means that annular grooves (178) for the attachment of lateral oil insulation discs, bearing discs (180) or similar devices are formed. The discs (180) have a U-ring profile. They rest with their inner radial U-ring limbs (182) in the annular grooves (178), extend laterally in front of the cage ring (142) with the back portion (184) of the U-ring and overlap the cage ring segments (144) that are offset from the outer ring (140) of the free-wheel with their outer radial U-ring limbs (186).

It is claimed:

1. A clamping element free-wheel comprising, in combination: an inner ring (32, 138) and an outer ring (32, 140); a plurality of clamping elements (18, 116) arranged between the rings (30, 32; 138, 140), the clamping elements (18, 116) each having an outer radial thickening (24), a central waist (22, 152) and an inner radial thickening (20, 150) of a specified height; and at least one cage ring (10, 142) that guides the clamping elements (18, 116) in a synchronous manner and is arranged on the height of the radial inner thickening (20, 150) of the clamping elements, whereby the cage ring consists of two cage ring segments (34, 144) that are axially spaced apart and axial webs (38, 146) that connect the cage ring segments and whereby pockets (14, 148) for the clamping elements (18, 116) are formed between the webs and whereby the cage ring (10, 142) consists of viscoelastic plastic material; wherein each of the webs (38, 146) have at least one axially oriented side of a radial thickness that generally corresponds with the height of the inner radial thickening (20, 150) of the clamping elements (18, 116) such that the side is impinged on by a clamping elements (18, 116) during a rebound of such clamping element caused by an overload and each of the webs (28, 146) includes a section (58) that protrudes radially outward over the cage ring segments (34, 144).

2. The free-wheel according to claim 1, wherein the webs (38, 146) of the cage ring (10, 142) each include protruding ribs (154).

3. The free-wheel according to claim 1, wherein the outward protruding section (58) of the webs (38) is integral with a projection (60) of the cage ring segment (34).

4. The free-wheel according to claim 1, wherein the webs (38, 146) of the cage ring (10, 142) terminate such that they are radially outward flush with the outer diameter of the cage ring segments (34, 144).

5. The free-wheel according to claim 1, wherein the cage ring segments (144) protrude radially outward over the web (146).

6. The free-wheel according to claim 5, wherein the cage ring segments 144 extend toward the outer ring (140) and maintain a specific radial distance from the outer ring (140).

7. The free-wheel according to claim 1, wherein the webs (38, 146) of the cage ring (10, 142) protrude radially inward over the inner diameter of the cage ring segments (34, 144).

8. The free-wheel according to claim 7, wherein the inward protruding section (56, 166) of the webs (38, 146) is offset (178) from the cage ring segments (34, 144).

9. The free-wheel according to claim 1, wherein the webs (38, 146) of the cage ring (10, 142) terminate such that they are radially inward flush with the inner diameter of the cage ring segments (34, 144).

10. The free-wheel according to claim 1, wherein the webs (38, 146) have a profile that decreases in the peripheral direction to a minute radial thickness from its maximum radial thickness at the side (60, 146) impinged on during a rebound caused by an overload.

11. The free-wheel according to claim 1, wherein the webs (38, 146) include radial outer sides that are graded (54, 164; 66, 172).

12. The free-wheel according to claim 1, wherein the web (38, 146) includes side surfaces (44, 46; 160, 162) which are tilted against the peripheral direction.

13. The free-wheel according to claim 1, further including a spring ring (48, 126) positioned at the height of the waist (22, 152) of the clamping elements (18, 116), whereby the spring ring includes flexible tongues (52, 120) that impinge on the clamping element (18, 116) and prestress the clamping elements in the direction of rotation.

14. The free-wheel according to claim 13, wherein the flexible tongues (52, 120) extend radially inward from the spring ring (48, 126) over the webs (38, 146).

15. The free-wheel according to claim 13, wherein the flexible tongues (52, 120) are tapered towards the clamping elements (18, 116).

16. The free-wheel according to claim 13, wherein the flexible tongues (52, 120) engage the clamping elements (18, 116) as a result of the elastic deformation of the spring ring (48, 126) that occurs in the installed condition.

17. The free-wheel according to claim 13, wherein the spring ring (48, 126) is embossed in order to bend the spring ring (48, 126) and thus form the flexible tongues (52, 120).

18. The free-wheel according to claim 13, wherein spring ring (48) is open over its periphery.

19. The free-wheel according to claim 13, wherein the spring ring (26) includes interlockable band ends for closing the spring ring (26) over its periphery.

20. The free-wheel according to claim 13, wherein the spring ring (48, 126) is radially spaced from the cage ring (10, 142).

21. The free-wheel according to claim 13, wherein the spring ring (48, 126) is located in a position of flush engagement encompassing the cage ring (10, 142).

22. The free-wheel according to claim 13, wherein the spring ring (48, 126) consists of two spring ring segments (134) axially spaced apart and axial spring ring webs (112) that connect the spring ring segments (134), whereby pockets (114) for receiving the clamping elements (18, 116) are formed between the spring ring webs, and more than one latch (122) located on the spring ring webs (112), said latches being either bent to form a hook (124) or cut off in order to form an interlocking edge (132).

23. The free-wheel according to claim 22, wherein the latch (122) is cut off at one end of the band and is bent to form a hook (124) at the opposed end of the band.

24. The free-wheel according to claim 22, wherein the spring ring webs (112) each include at least two latches (122) with a flexible tongue (52, 120) positioned therebetwen in symmetrical arrangement on the spring ring webs (112) and extend into the pocket (114) to impinge on the clamping element (18, 116).

25. The free-wheel according to claim 22, wherein the spring ring webs (112) each include at least two flexible tongues (52, 120), with a latch (112) positioned therebetween in symmetrical arrangement on the spring ring web (112) and extend into the pocket (114) impinge on the clamping element (18, 116).

26. The free-wheel according to claim 22, wherein the spring ring (48, 126) includes a billow (64, 136), and the hooks (124), the flexible tongues (52, 120) and the billow (64, 136) are directed in a specific radial direction.

27. The free-wheel according to claim 26, wherein the billow (64, 136) is radially inward directed and engages either the webs (38, 146) or the cage ring segments (36, 144).

28. The free-wheel according to claim 22, wherein the spring rings (48, 126) consist of a spring band section that is produced from a continuous band of material.

29. The free-wheel according to claim 28, wherein the ring segments (134) at the end of the spring band section are separated in an extension of the frontal edge (128) of the web from which the hooks (124) protrude.

30. The free-wheel according to claim 28, wherein the beginning of a spring band section is formed by a web (112) from which the latches (118, 120) are removed.

31. The free-wheel according to claim 28, wherein the ring segments (134) at the beginning of a spring band section protrude over a first web (112) from which the latches (118, 122) are removed.

32. The free-wheel according to claim 1, wherein each web (38, 146) includes radial outer sides that are graded (54, 164; 66, 172) in a curvilinear shape (68, 174).

33. The free-wheel according to claim 1, further including a double cage ring, positioned between the inner ring (30, 138) and the outer ring (32, 140), having an outer cage ring (112) and wherein the cage ring (10, 142) is utilized as the inner cage ring.

34. The free-wheel according to claim 33, wherein the outer cage ring (112) is composed of a hard plastic.

35. The free-wheel according to claim 34, wherein the outer cage ring (112) is composed of a hard plastic with fiber reinforcement.

36. The free-wheel according to claim 33, wherein the outer cage ring (112) is composed of a viscoelastic material.

37. The free-wheel according to claim 33, wherein the outer cage ring (112) is of a thickness generally equivalent to the thickness of the outer radial thickening (124) of the clamping element (18, 116).

38. The free-wheel according to claim 33, wherein the outer cage ring (112) includes at least one rib (62) offset from the cage ring segments (36, 144) for creating frictional engagement between the outer cage ring (12) and the outer ring (32, 140).

39. The free-wheel according to claim 33, including means for interlocking the outer cage ring (12) and the outer ring (32, 140).

40. The free-wheel according to claim 33, wherein at least one cage ring (10, 12, 142) is composed of plastic material that is cross-linked by gamma-irradiation.

* * * * *